(12) United States Patent
Bartolucci et al.

(10) Patent No.: US 11,580,097 B2
(45) Date of Patent: Feb. 14, 2023

(54) BLOCKCHAIN-BASED SYSTEMS AND METHODS FOR COMMUNICATING, STORING AND PROCESSING DATA OVER A BLOCKCHAIN NETWORK

(71) Applicant: nChain Licensing AG, Zug (CH)

(72) Inventors: Silvia Bartolucci, London (GB); Pauline Bernat, London (GB); Daniel Joseph, London (GB)

(73) Assignee: nChain Licensing AG, Zug (CH)

( * ) Notice: Subject to any disclaimer, the term of this patent is extended or adjusted under 35 U.S.C. 154(b) by 280 days.

(21) Appl. No.: 16/648,214

(22) PCT Filed: Sep. 11, 2018

(86) PCT No.: PCT/IB2018/056908
§ 371 (c)(1),
(2) Date: Mar. 17, 2020

(87) PCT Pub. No.: WO2019/053585
PCT Pub. Date: Mar. 21, 2019

(65) Prior Publication Data
US 2020/0265037 A1    Aug. 20, 2020

(30) Foreign Application Priority Data
Sep. 18, 2017   (GB) ..................... 1714987

(51) Int. Cl.
*G06F 16/00* (2019.01)
*G06F 16/23* (2019.01)
(Continued)

(52) U.S. Cl.
CPC ........ *G06F 16/2379* (2019.01); *H04L 9/0643* (2013.01); *H04L 9/30* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2016/0027229 A1 | 1/2016 | Spanos et al. | |
| 2016/0162897 A1* | 6/2016 | Feeney | H04L 9/3236 705/71 |

(Continued)

FOREIGN PATENT DOCUMENTS

| | | |
|---|---|---|
| WO | 2017145008 A1 | 8/2017 |
| WO | 2017145020 A1 | 8/2017 |

OTHER PUBLICATIONS

Belcher, "Payment Channel Payouts: An Idea for Improving P2Pool Scalability," retrieved from https://bitcointalk.org/index.php?topic=2135429.0, Aug. 2017, 14 pages.
(Continued)

*Primary Examiner* — Hasanul Mobin
(74) *Attorney, Agent, or Firm* — Davis Wright Tremaine LLP

(57) ABSTRACT

A computer-implemented method for transmitting and/or submitting digital content such as feedback for an entity to a blockchain is disclosed. This may be, for example, the Bitcoin blockchain. The method, which is implemented at a first node, includes: submitting, to the blockchain, a first transaction for committing a first quantity of tokens to transfer to a second node associated with the entity, the first transaction having a first output; generating a first content for submission to the blockchain; and submitting, to the blockchain, a second transaction that returns a second quantity of the committed first quantity of tokens to an address associated with the first node, the second transaction having the first output of the first transaction as an input, wherein the first content is used to unlock the first output of the first transaction.

7 Claims, 6 Drawing Sheets

(51) Int. Cl.
*H04L 9/06* (2006.01)
*H04L 9/30* (2006.01)
*H04L 9/00* (2022.01)

(56) References Cited

U.S. PATENT DOCUMENTS

| | | | |
|---|---|---|---|
| 2016/0261411 A1* | 9/2016 | Yau | G06Q 20/38215 |
| 2016/0330034 A1* | 11/2016 | Back | G06Q 20/065 |
| 2017/0140394 A1 | 5/2017 | Cao et al. | |
| 2017/0213221 A1* | 7/2017 | Kurian | G06Q 20/4014 |
| 2017/0279783 A1* | 9/2017 | Milazzo | B33Y 50/00 |
| 2017/0331810 A1* | 11/2017 | Kurian | H04L 63/108 |
| 2017/0358041 A1 | 12/2017 | Forbes, Jr. et al. | |
| 2018/0077122 A1* | 3/2018 | Hoss | G06F 16/27 |
| 2018/0225660 A1* | 8/2018 | Chapman | G06Q 20/10 |
| 2018/0287790 A1* | 10/2018 | Everett | H04L 63/0823 |
| 2018/0359095 A1* | 12/2018 | Asati | G06F 16/2228 |
| 2019/0019144 A1* | 1/2019 | Gillen | H04L 9/3213 |

OTHER PUBLICATIONS

Bitcoin Wiki, "Contract," retrieved from https://en.bitcoin.it/wiki/Contract, Jan. 5, 2017, 12 pages.
International Search Report and Written Opinion dated Nov. 12, 2018, Patent Application No. PCT/IB2018/056908, 11 pages.
Kudos, "The Blockchain Protocol for Trusted Ratings and Performance Driven Rewards," 2018, 27 pages.
Kudos, "The Kudos Project," retrieved from https://www.kudosproject.com/, 2017, 8 pages.
Lina, "Blockchain Based Review Platform," Lina Network, Jan. 1, 2018, 23 pages.
Poon, "SIGHASH_NOINPUT in Segregated Witness," retrieved from https://bitcoin-development.narkive.com/ByYWXcxA/sighash-noinput, 2016, 7 pages.
Revain, "New Generation Feedback Platform Based on the Blockchain Technology," Revain Technologies Inc, 2017, 24 pages.
Rikken, "BPM and Blockchain, miles apart or closer than you think?" retrieved from https://www.bpmleader.com/2015/11/17/bpm-blockchain-miles-apart-closer-think/, 2015, 3 pages.
Todd, "CoinCovenants using SCIP signatures, an amusingly bad idea," Bitcoin Forum, Aug. 20, 2013 [retrieved Jan. 18, 2018], https://bitcointalk.org/index.php?topic=260898.60, 19 pages.
UK Commercial Search Report dated Jan. 26, 2017, Patent Application No. GB1714987.3, 7 pages.
UK IPO Search Report dated Mar. 9, 2018, Patent Application No. GB1714987.3, 8 pages.
Xu et al., "The Blockchain as a Software Connector," 2016 13th Working IEEE/IFIP Conference on Software Architecture (WICSA), Apr. 5, 2016, 10 pages.
Zapit, "The Only Blockchain-Verified Product Reviews Platform," 2018, 13 pages.

\* cited by examiner

BLOCKCHAIN-BASED SYSTEMS AND METHODS FOR COMMUNICATING, STORING AND PROCESSING DATA OVER A BLOCKCHAIN NETWORK

This invention relates generally to a secure communications systems and, more particularly, to systems and methods for communicating data/content to a node on a network using a blockchain ledger in a secure manner that allows only authorized nodes to communicate the requested data/content. The data/content may be provided and stored in a digital form, and may comprise a variety of types of data or information, and in a variety of formats.

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be (i) validated by the first node that receives the transaction—if the transaction is validated, the node relays it to the other nodes in the network; (ii) added to a new block built by a miner; and (iii) mined, i.e. added to the public ledger of past transactions. Once recorded, the data in any given block cannot be altered retroactively without altering all subsequent blocks and a collusion of the network majority.

Transactions involve the transfer of one or more tokens from one node to another node. Tokens may represent future control of network resources. In some cases, the tokens may represent an asset or value, but not necessarily. For example, in some cases, the tokens may be understood as a cryptocurrency. However, the present application is not limited to implementations in the context of cryptocurrency and is more broadly understood as relating to blockchain networks for distributed transfer of control tokens.

A blockchain serves as a public ledger that can record transactions between parties in a verifiable and permanent way. Blockchains possess numerous properties, such as irrevocability of information stored on-chain and trust established through decentralized consensus, which make them suitable for use in various different types of applications. For example, blockchains may find practical application as platforms for recording and publishing digital content.

In one non-limiting example, this may be customer feedback, such as user reviews of products, services, and/or their providers. Customer feedback, in the form of, for example, reviews or numeric ratings, can influence consumer trust in products and services, while also informing the quality assurance efforts of manufacturers, retailers, and service providers. Businesses are, by their nature, financially motivated to try to garner positive customer feedback, giving rise to the possibility of various actors engaging in review manipulation. A blockchain may provide an appropriate environment for deterring review/feedback manipulation (such as review fixing, deletion, etc.) by allowing reviews/feedback to be recorded publicly and permanently on an open, distributed ledger, without reliance on a central authority to validate the reviews/feedback.

While the potential for deploying platforms for collecting content using blockchains is attractive, numerous challenges, such as preventing multiple submissions of the content, incentivizing submission by content providers, and preserving user privacy, remain to be addressed. Modern-day platforms for collecting content such as, for example, customer reviews of products and services are generally implemented using input interfaces (e.g. graphical user interfaces) that a user (content provider) can interact with in order to submit their content. These input interfaces may, for example, be found on a merchant's website or mobile application, or on a communal platform that aggregates content submissions for a plurality of different collecting organisations such as, for example, merchants. Examples may include consumer reports websites, eBay, etc. An input interface for submitting content may be as simple as a GUI element that corresponds to a numeric or descriptive rating (e.g. a button for a "Like" or a set of buttons representing a five-star rating scale), or it may be displayed to a content provider in the form of a text box for receiving input text. The items of content, once submitted, are processed by the relevant computer systems for the platform, such as, for example, the servers that are owned by a merchant or used for operating an online marketplace (e.g. Amazon). Often, in the case of reviews, the submitted reviews would be processed, "behind-the-scenes", by the entity that is being reviewed or by a moderator of the reviews collection platform, prior to being published for public access. For example, there may be a delay between the submission of a specific comment and its public disclosure. This "black box" model of processing, in which content is simply submitted as input to a network of computers controlled by parties with vested interest in the content of the reviews, may ostensibly be problematic. In particular, such a model may open the door to entities potentially tampering with content or selectively publishing certain items such as positive reviews, resulting in a skewed and inaccurate perception of the entities and/or their products/services being established.

In scenarios relating to submission of reviews, as more reviews are collected for a particular product/service, greater diversity of opinions can be represented, and the influence of bias or anomalous impressions on an overview of the quality, user experience, etc. of the product/service can be mitigated. The benefits of amassing more reviews for a product/service may be bolstered by ensuring that messages/data can only be transmitted by those that have actually purchased and/or used the product/service. Accepting only those reviews that are submitted by past purchasers and users may add greater credibility to the substance of the reviews and create a useful nexus between service providers and actual customers. Verifying the validity of reviews (i.e. checking that the reviews originate from authorized sources) may, however, involve a cumbersome process that discourages users from submitting reviews altogether.

Problems that exist in review and feedback submission systems are not limited to such systems. Indeed, similar problems exist in systems of various types. Problems noted above may apply to messaging systems generally and it is, therefore, desirable to provide improved messaging or communication transmission systems which limit or restrict the ability of an unauthorized sender to participate. Such improved messaging systems may be used, for example, in content collection systems or in other systems that rely on messaging. Such messaging systems may, for example, restrict the parties that are permitted to provide messages and may prevent or inhibit unwanted or unauthorized messages, such as spam.

Accordingly, it may be desirable to provide methods and systems which provide improved messaging techniques. Such methods and systems may be used, for example, for collecting and/or transmitting digital content and/or data in a transparent and reliable fashion.

Such an improved solution has now been devised.

In accordance with the present invention there are provided methods and devices as defined in the appended claims.

The invention may provide a computer-implemented method and corresponding system. The method/system may be described as a blockchain-implemented method/system. The invention may be described as a security method or cryptographic method/system. It may provide for the secure transfer or transmission of a digital asset such as a portion or quantity of cryptocurrency. Additionally or alternatively, it may provide a control mechanism for controlling the transfer of a digital asset such as a portion or quantity of cryptocurrency.

Additionally or alternatively, the present application describes a computer-implemented method for providing secure messaging. It may be described as a secure communication and/or transmission solution (method/system). For example, the present application may describe a computer-implemented method for transferring, transmitting or communicating data to a blockchain. The data may be submitted to the blockchain for an entity. The data may be digital content, or some other digital resource. It may relate to an entity, organization, a product or service. For the sake of convenience, the terms "data", "digital resource" or "feedback" may be used herein instead of "content". The terms "feedback" or "review" are not intended to be limiting. The term "submitting" may be used herein as an alternative to "transmitting" or "communicating".

The method, which may be implemented at a first node, may comprise: transmitting, to the blockchain, a first transaction ($T_c$) for committing a first quantity (x) of tokens to transfer to a second node associated with an entity (which may be a node), the first transaction ($T_c$) having a first output; generating a first portion of data (referred to hereafter for convenience as "content") for transmission to the blockchain; and transmitting, to the blockchain, a second transaction ($T_{f_1}$) that returns a second quantity (d) of the committed first quantity (x) of tokens to an address associated with the first node, the second transaction ($T_{f_1}$) having the first output of the first transaction ($T_c$) as an input, wherein the first content is used to unlock the first output of the first transaction ($T_c$).

In some implementations, an unlocking script of the second transaction ($T_{f_1}$) may include the first content.

In some implementations, a locking script of the first output of the first transaction ($T_c$) may include a set of permitted data ("content") entries and wherein the first content corresponds to one of the permitted content entries. In some implementations, the set of permitted content entries includes hashes of one or more permitted data ("content") values.

In some implementations, the method may further include receiving, at the first node, an indication of the one or more permitted content values, and generating the first content comprises selecting one of the permitted content values.

In some implementations, the unlocking script of the second transaction ($T_{f_1}$) may include a signature corresponding to a public key associated with the first node.

In some implementations, the one or more permitted content values may comprise one or more discrete ratings.

In some implementations, metadata for the second transaction ($T_{f_1}$) may include an identifier associated with a product offered by the entity.

In some implementations, the first transaction ($T_c$) may have a second output different from the first output and the method may further include: determining that a transaction having the second output of the first transaction ($T_c$) as an input has been transmitted to the blockchain by a first time (nLockTime); and in response to the determination, transmitting, to the blockchain, a third transaction ($T_{f_2}$) that transfers a third quantity (x−d) of the committed first quantity (x) of tokens to an address associated with the first node. In some implementations, the third transaction ($T_{f_2}$) includes a transaction parameter (nLockTime) specifying a point in time after which the third transaction ($T_{f_2}$) becomes eligible for transmission to the blockchain. In some implementations, the transaction parameter (nLockTime) specifies a point in time that is a fixed length of time (s) after a time (T) at which the first transaction ($T_c$) is transmitted to the blockchain.

In some implementations, the third transaction ($T_{f_2}$) may be created and signed by the entity prior to transmission of the first transaction ($T_c$) to the blockchain.

In some implementations, the third quantity (x−d) may be equal to the difference between the first quantity (x) and the second quantity (d).

Additionally or alternatively, the present application describes a computing device to participate in a process for transmitting content (which may be feedback, for example) for an entity to a blockchain. The computing device includes a processor, a memory, a network interface to provide network connectivity, and a blockchain application containing computer-executable instructions that, when executed by the processor, cause the processor to carry out a method described herein.

Additionally or alternatively, the present application describes a non-transitory processor-readable medium storing processor-executable instructions to participate in a process for transmitting content to a blockchain. The processor-executable instructions, when executed by a processor, cause the processor to carry out a method described herein.

Some implementations may be used to provide a secure messaging (i.e. communication or transmission) system which implements restrictions on nodes transmitting messages. For example, a node transmitting a message that includes content (which may be feedback purely for example) may have to perform a predefined operation before becoming authorized to transmit such content. For example, the node may be required to transmit the first transaction ($T_c$) before being permitted to transmit the message that includes the content. Transmitting the first transaction ($T_c$) may also only allow the node to transmit a single item of content (such as a single review), preventing spam.

The present application describes blockchain-based systems and methods which facilitate secure and efficient implementation of schemes for encrypting, validating, and broadcasting reviews that are submitted by users participating in a review platform. In some implementations, the present application provides protocols that are designed to prevent unqualified submissions of malicious actors from influencing the result of product and/or service review outcomes.

Any feature described in relation to one aspect or implementation of the invention may also be used in respect of one or more other aspects/implementations. These and other aspects of the present invention will be apparent from and elucidated with reference to, the implementation described herein. An implementation of the present invention will now be described, by way of example only, and with reference to the accompany drawings, in which.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "entity" refers to any entity that receives or is capable of receiving content such as feedback (e.g. customer feedback in the form of reviews, ratings, evaluations, comments, etc.). An "entity" may additionally or alternatively refer to a representative that is authorized to receive content on behalf of an entity. For example, an "entity" may be: an organization, such as a retailer, service provider, or a product manufacturer; a representative of an organization (e.g. the customer service department of a company); or a person (e.g. a reseller, an independent contractor, etc.). In the context of the content transmission protocol described herein, an entity may be represented by one or more nodes in a blockchain network. In some cases, an entity may solicit users and purchasers of their products/services to submit reviews or feedback or other content. The reviews/feedback/content for an entity are submitted by users, represented as participating nodes, and are publicly disclosed by being broadcast on a blockchain public ledger.

In the present application, a "reviewer" refers to an organization or an individual that submits content, such as feedback for an entity and/or reviews of an entity's products/services. A reviewer may, for example, be a participant in the Content Submissions Protocol (CSP) disclosed herein. A "reviewing node" is a node (in a blockchain network) that is associated with a particular reviewer, and a "user node" is a node associated with a user of a product/service who submits a suitable review for the product/service, in accordance with the CSP of the present disclosure.

However, the term "reviewer" is only used because of the context of the illustrative embodiment that has been chosen herein. In more general terms, the "reviewer" is essentially a provider of some content/message. Thus, the term "provider" is a more generic term for "reviewer" herein.

Figure 1:
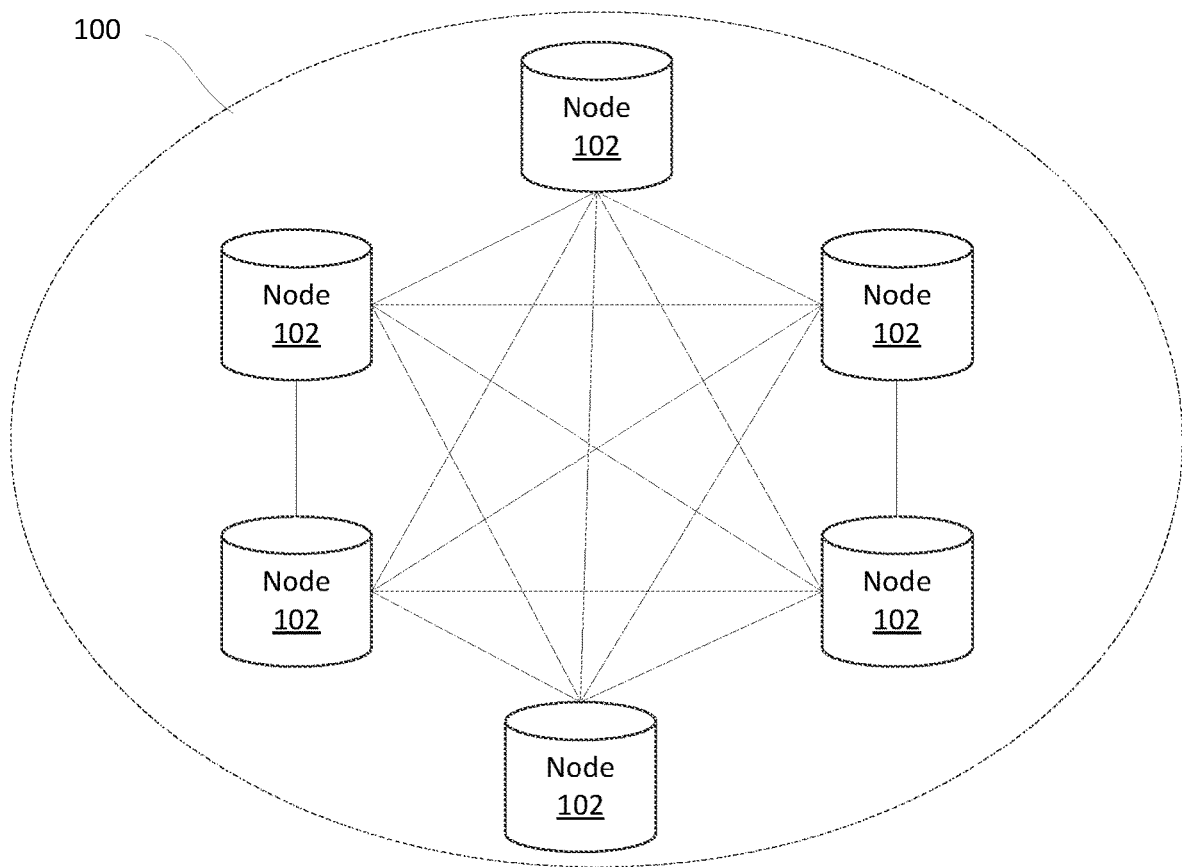
FIG. 1 illustrates an example blockchain network of nodes.

Reference will first be made to FIG. 1 which illustrates, in block diagram form, an example blockchain network 100 associated with a blockchain. The blockchain network is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the individual nodes 102 may be located in geographically dispersed locations.

Nodes 102 maintain a global ledger of all transactions on the blockchain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which tokens are transferred as a result of the transaction. Those tokens are then associated with that output address as an available transaction output. In the context of a cryptocurrency, like Bitcoin, an available transaction output may be referred to as an unspent transaction output (UTXO). A subsequent transaction may then reference that address as an input in order to transfer those tokens to one or more other addresses.

Nodes 102 may be of different types or categories, depending on their functionality. It has been suggested that there are four basic functions associated with a node 102: wallet, mining, full blockchain maintenance, and network routing. There may be variations of these functions. Nodes 102 may have more than one of the functions. For example, a "full node" offers all four functions. A lightweight node, such as may be implemented in a digital wallet, for example, and may feature only wallet and network routing functions. Rather than storing the full blockchain, the digital wallet may keep track of block headers, which serve as indexes when querying blocks. Nodes 102 communicate with each other using a connection-oriented protocol, such as TCP/IP (Transmission Control Protocol).

In most blockchain networks, irrespective of the governing protocol, it is advantageous to ensure that new transactions are propagated quickly through the network so that all nodes that maintain a pool of unconfirmed transactions (typically called the "mempool") have an up-to-date and accurate database of transactions awaiting inclusion in a new block. Mining nodes draw on this pool of unconfirmed transactions to build potential new blocks. In some cases, the mining nodes maintain a full mempool locally so that they can assemble unconfirmed transactions into a new block for mining. In some implementations, the mempool may be managed and maintained by a separate network of nodes (which may be called validator nodes, or the like) and those nodes may sent a set of unconfirmed transactions from the mempool to the mining nodes to enable the mining nodes to attempt to mine a block. In some implementations, the mempool may be stored in a distributed hash table among a plurality of nodes. Irrespective of the structure, it is desirable that any new transaction be propagated through the network to reach the necessary nodes as soon as possible. It is also desirable that any new successfully mined blocks be propagated through the network as fast as possible so as to reduce the occurrence of orphan blocks.

In current implementations of the Bitcoin network, as an example, each node that receives a new transaction validates the transaction and then sends it to all of the nodes to which it is connected if those nodes have not already received the new transaction. In case of Bitcoin, the nodes use TCP/IP (Transmission Control Protocol). A node that receives a new transaction sends an INV message to each peer node with data regarding the available new transaction(s), and will receive back a GETDATA message from each node interested in receiving the new transaction(s). The node then sends, the transaction in a (separate) TCP message to each of the nodes that requested it.

The present disclosure provides a blockchain-based messaging protocol which may be used, for example, for content submission/transmission. Where the messaging protocol is used for content submission, it may be referred to as a content submission protocol. The example used for illustrative purposes is the submission of review or feedback content. However, the invention is not limited to this application and other types of digital content or messages will fall within the scope of the invention.

More specifically, a protocol for submitting content such as feedback for an entity or reviews of its products/services using a blockchain ledger is disclosed for illustrative purposes. According to an example implementation of the protocol, when a user acquires a product or receives a service from an entity, the user node submits, within a prescribed period of time, a review for the product/service. The review itself is inserted directly in an unlocking script for a blockchain transaction created by the user. By linking the blockchain transaction that is executed in order to acquire a certain product/service from an entity with the blockchain transaction that is executed for submitting a review of the product/service, the protocol ensures that only authorized participants (i.e. actual users and purchasers of the entity's products/services) are able to submit their reviews and have those reviews publicly broadcast and stored on the blockchain. The protocol can thus help to prevent scenarios in which unauthorized users try to control multiple different identities to artificially sway the reviews and manipulate the perception of a product/service (e.g. submitting multiple fake reviews aimed at deliberately harming an entity's/product's reputation).

The proposed protocol leverages blockchain concepts to provide a system/platform for collecting customer reviews or otherwise messaging that requires timely submission of content/messages, accepts only messages/content originating from authorized sources, and adds transparency to the process of collecting content and messaging.

In the description herein, the terms "user node", "input address", and "output address" may be used. The reference to an "address" of a node is not meant to refer to a network address of a physical node. Instead the "address" is an address specified in a transaction on the blockchain having an allocation of tokens to which the physical node can claim ownership by having a key that corresponds to a signature on the transaction. In this sense, the "output address" is not an address of a user node, but is a blockchain transaction output address that is owned by or associated with a user node. Likewise, the "input address" is an address of an available transaction output (in cryptocurrency terms, a UXTO) that is owned by or associated with a user node.

The terms "feedback" and "review" may be used interchangeably throughout the description, and will be understood as referring to a suitably formatted expression (e.g. numeric or descriptive ratings, comments, etc.) of a reaction to or impression of one or more attributes (e.g. perceived quality, etc.) of an entity and/or its products/services.

Content Submissions Protocol (CSP)

The present application describes methods and systems for submitting customer reviews and feedback using a blockchain. In particular, the present application proposes a content submissions protocol (Content Submissions Protocol, or CSP) which leverages blockchain concepts to allow users to submit content and messages, such as reviews of products and services, and to have those reviews recorded publicly and permanently on a distributed ledger. The CSP is designed to promote the submission of content, such as reviews of products and services, by offering the user the possibility of claiming a specific incentive that is directly linked to a transaction for acquiring the product/service. In this way, the CSP ensures that only "approved" content— that is, content, such as reviews, originating from authorized users, such as purchasers and past users of the product/service—are accepted and considered for disclosure on the blockchain ledger. Furthermore, by facilitating the public disclosure of content (such as reviews and feedback), the CSP may help to prevent any manipulation of submitted content by interested parties.

Figure 2:
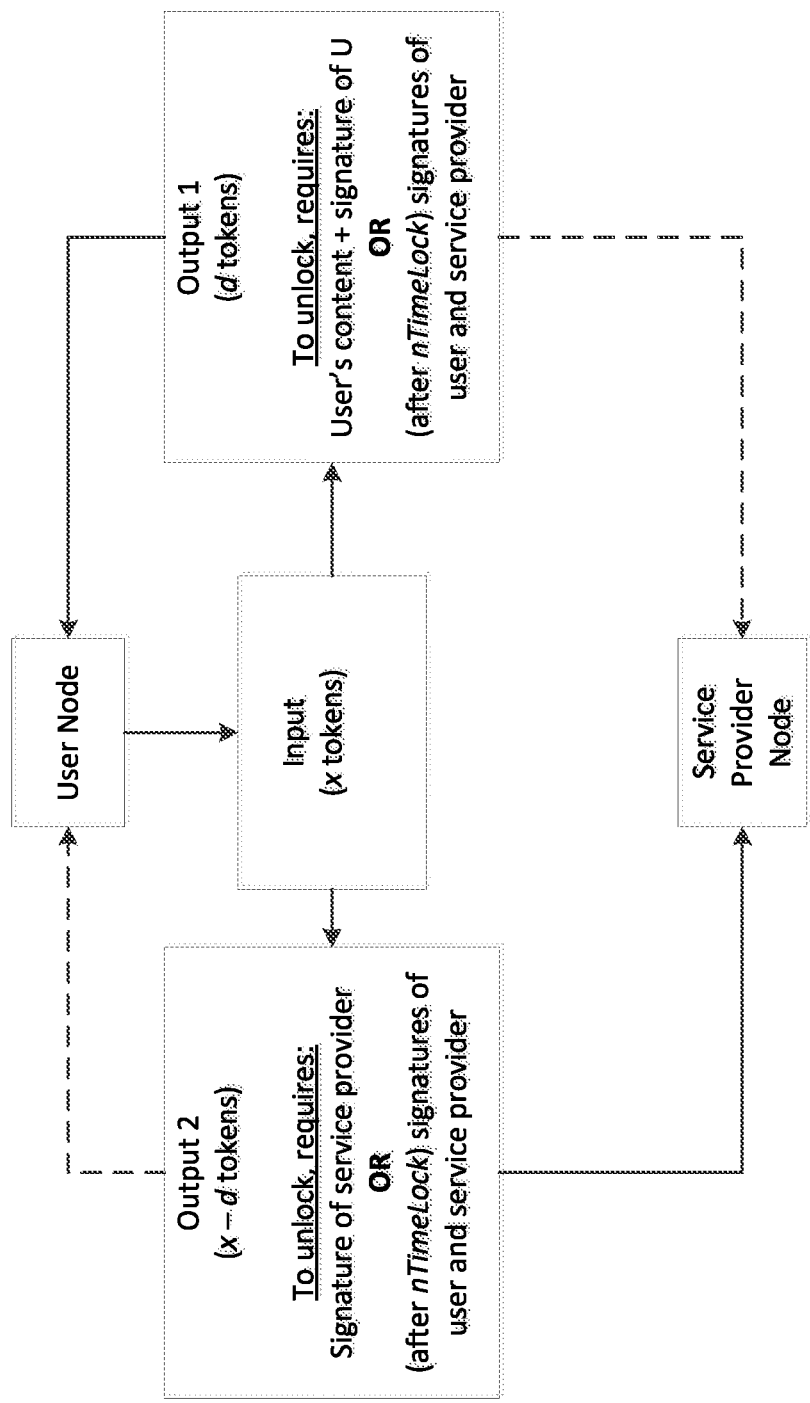
FIG. 2 shows a schematic representation of an example incentivized content submissions (transmission) protocol (CSP), in accordance with an implementation of the present application.

Reference is now made to FIG. 2, which shows a schematic representation of an example implementation of the CSP. The CSP includes one or more user nodes (corresponding to users/reviewers) and at least one entity node (which may correspond to entities that receive feedback or whose products/services are reviewed). For example, the providers (i.e. reviewers/content-submitters) may be customers who have purchased or used a product/service and the entity may be at least one of a manufacturer, seller, or service provider involved in the provision of the product/service.

In order to acquire a product or receive a service, a user node transfers a fixed quantity of tokens to an entity node associated with an entity that offers the product/service. In particular, the user node may create a transaction $T_c$ to transfer a fixed quantity x of digital assets (i.e. tokens) to the entity node in exchange for acquiring the product/service from the entity. According to example implementations of the CSP, the "acquisition" transaction $T_c$ has two or more transaction outputs. A first output, comprising d quantity of tokens, represents incentive tokens that are offered to a user for submitting content, such as a review for the acquired product or service. That is, a portion of the committed quantity x of tokens for transfer to the entity node is set aside to be used as an incentive for a customer/user of the product or service (i.e. the user node) to submit content, such as a review. The amount of the "discount" is agreed on by the user and the entity, and can be redeemed by the user node upon submitting content (e.g., a review). A second output of $T_c$, comprising x–d tokens, represents a discounted transfer of tokens that can be redeemed by the entity node in the case that content is submitted by an authorized user node. In particular, the total quantity of tokens that is actually transferred to the entity node may be less than the initially committed quantity x, such that a suitable incentive—in the form of a "return" transfer of tokens—can be provided to a user node to submit content such as a review for a product/service.

Figure 3:
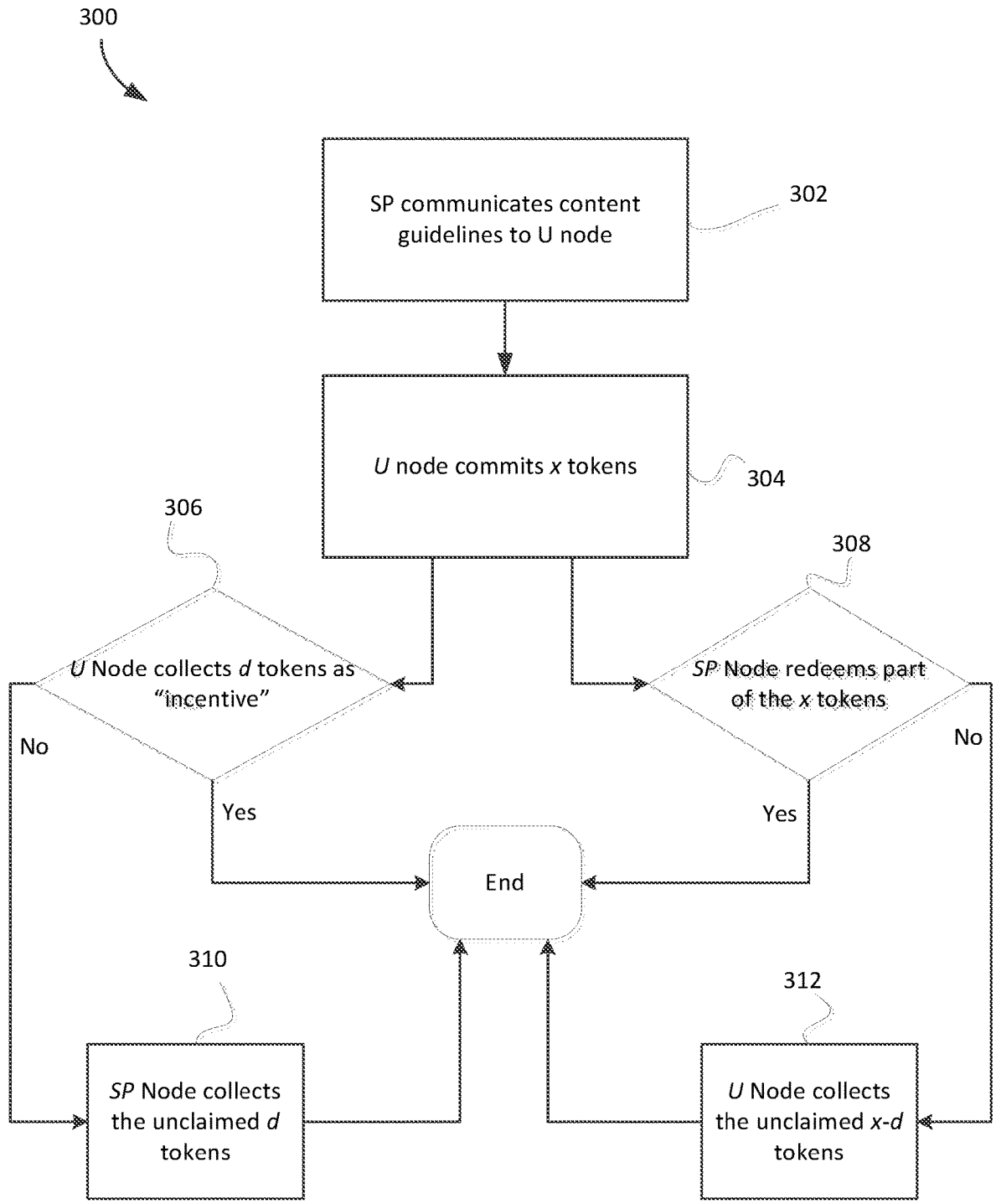
FIG. 3 shows, in flowchart form, a summary of an example CSP, in accordance with an implementation of the present application.

Reference is now made to FIG. 3, which shows a flowchart 300 summarizing an example implementation of the CSP. Flowchart 300 illustrates the various blockchain transactions that are created in order to implement the CSP. A user acquires a product or receives a service provided by an entity. At step 302, an entity node communicates a content guideline, such as a feedback guideline for the product/service, to the user node. More precisely, the entity node conveys a set of acceptable content values for the product/service to the user node. For example, the options for content values may be numeric (e.g. on a numbered scale) or descriptive ratings ("excellent-good-average-poor") that are predefined by the entity as being acceptable when submitted by a user for a particular product/service.

At step 306, the user node commits, via a commitment transaction, x tokens to transfer to the entity, as payment for the acquired product or received service. After this initial commitment transaction, the user node and the entity node can independently redeem their respective shares of the committed quantity x of tokens (d and x–d, respectively), at steps 308 and 310, respectively. In particular, the user node can collect d tokens as its "incentive" for submitting suitable content, such as a suitable review for a product/service offered by the entity, and the entity node can claim the "discounted" payment of x–d for its sale of the product/service to the user.

In at least some implementations, the user node and the entity node may each have a fixed time frame during which they are allowed to collect their respective shares of the initially committed x tokens. For example, there may be a time constraint on when the user node must submit content, such as a review for a product/service, in order to be eligible to receive its incentive tokens. The time constraint can help to ensure that the content is submitted to the blockchain in a timely manner and not, for example, long after the time of acquisition of the product or receipt of the service. Similarly, the entity node may have a time constraint on when it must claim its "discounted" payment for the sale of the product/service. In some cases, the user node and the entity node may have the same time frame of eligibility for claiming their respective shares of the committed tokens. For example, each of the user node and the entity node may only be allowed to redeem their respective shares for a fixed length of time (e.g. one month) after the time of the initial commitment of tokens in the "acquisition" transaction. As shown in FIG. 3, if either of the respective shares is not claimed (or not claimed within a suitable time frame) by one of the nodes, the other node can collect the unclaimed quantity of tokens. More specifically, if the entity node does not claim the "discounted" payment, the user node can redeem the full amount of the x committed tokens, at step 314; similarly, if the user node fails to submit a suitable review for the product/service or other content (within the designated time frame), the entity node can collect the quantity of tokens allocated as the "incentive" at step 312, thereby receiving the full payment of the x committed tokens for the product/service.

Figure 4:
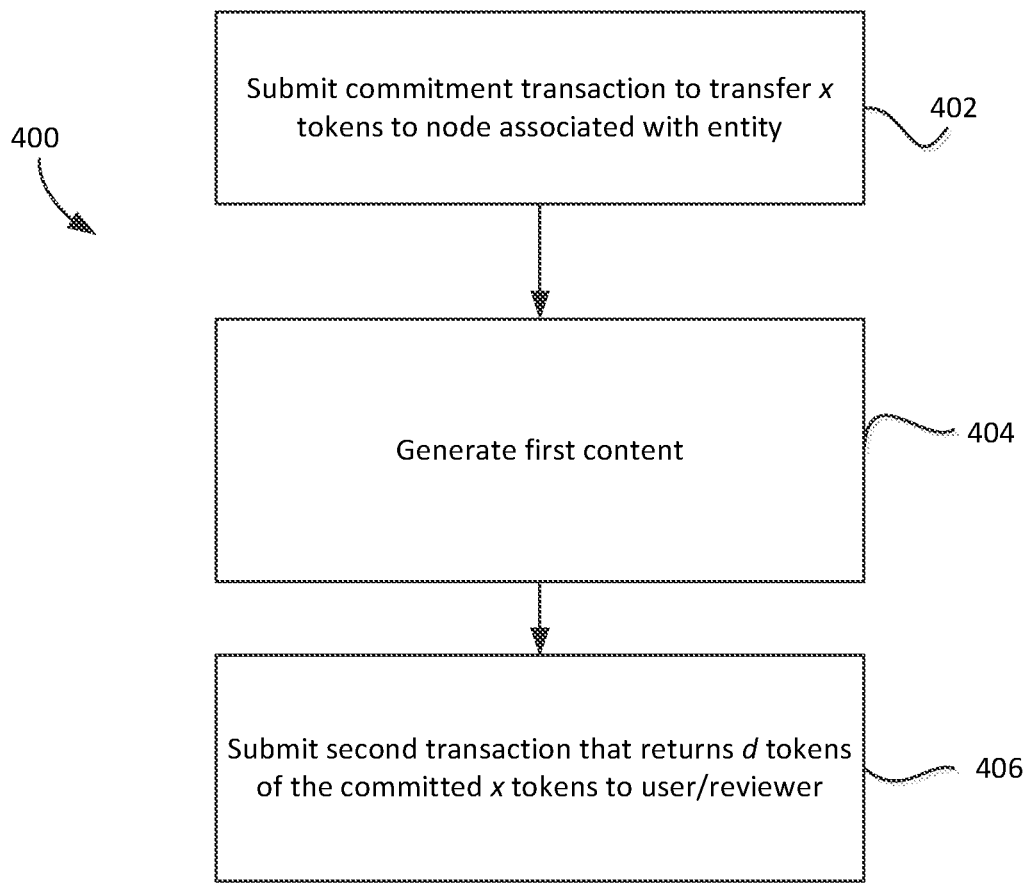
FIG. 4 shows, in flowchart form, an example method for submitting content for an entity to a blockchain, in accordance with an implementation of the present application.

Reference is now made to FIG. 4, which shows, in flowchart form, an example method 400 for submitting content, such as feedback for an entity to a blockchain. The method 400 may, for example, be performed by a node ("user node") in a blockchain network, such as network 100 of FIG. 1. In particular, the node may be associated with a user of a product/service who wishes to participate in the CSP. In some implementations, the user node is a wallet or other such blockchain entity. The method 400 may be suitable for systems/platforms for collecting reviews of products and services that are offered by various different commercial entities (e.g. manufacturers, retailer, service providers, etc.). For example, the method 400 may be incorporated into a content submissions platform such as a feedback submissions platform for online marketplaces. Entities that offer products/services may allow past purchasers and users to submit their reviews, using transactions that are recorded on the blockchain, based, at least in part, on the operations of method 400.

In operation 402, the user node submits a first transaction $T_c$ for committing a first quantity x of tokens to transfer to a second node that is associated with the entity. This initial commitment of tokens may, for example, represent the full transfer of tokens for a product/service acquired from the entity. The first transaction $T_c$ is created by the user node, and the user, who has a pair of public-private keys, ($Pk_U$, $Sk_U$), signs the first transaction $T_c$. The first transaction $T_c$ has two outputs. A first output corresponds to the incentive tokens to be transferred to the user node for submitting content such as a review for a product/service. The first output may, for example, represent a "discount" to the full payment for the product/service, which will be transferred back to the user node. In some implementations, a locking script for the first output may specify conditions relating to reviews or other content that are acceptable for a particular product/service. For example, the locking script may include a set of predefined content values (such as review values) which are deemed to be suitable for a product/service. The locking script encumbers the first output such that the first output can be unlocked with a transaction that includes both of 1) a signature that is valid for the public key associated with the user node; and 2) content included in the set of predefined content values (e.g., a review value included in a set of predefined review values). A second output, different from the first output, transfers a "discounted" quantity of tokens to the entity node, which has an associated pair of public-private keys ($Pk_{SP}$, $Sk_{SP}$). In particular, the "discounted" quantity of tokens represents the difference between the first quantity x and the incentive quantity of tokens d for the user. The second output is, therefore, locked with a locking script that allows the entity node to claim the discounted quantity of tokens using a signature generated from the private key associated with the entity node.

In operation 404, a first content (e.g., a first review/feedback) for submission to the blockchain is generated. The content may be a review that relates to the entity and/or the entity's product/service that was acquired by the user associated with the node. In operation 406, a second transaction $T_{f_1}$ is submitted to the blockchain, where the second transaction $T_{f_1}$ returns a second quantity d of the committed first quantity x of tokens to an address associated with the user node. The second transaction $T_{f_1}$ has the first output of the first (commitment) transaction $T_c$ as an input. In other words, the second transaction $T_{f_1}$ is a transaction that transfers the incentive tokens to the user node for submitting suitable content, such as a suitable review of a product/service acquired from the entity. To ensure that only content from authorized users are accepted, the first output, which is tied to the "incentive" for a content submission, is locked by specifying conditions that must be met to spend the "incentive" d tokens. In particular, the first content is used to unlock the first output of the first transaction $T_c$. That is, the incentive tokens can be obtained by a user node only upon the successful submission of suitable content (such as a suitable review for a product/service that the user acquired or received from the entity). For example, in some implementations, an unlocking script of the second transaction $T_{f_1}$ (which transfers the "incentive" amount to the user) may include the first content (or a hash of the first content). By inserting the first content directly in the unlocking script, the first content can be permanently broadcast on the blockchain once the second transaction is submitted to the blockchain (i.e. when the incentive tokens are claimed) by the user node. In some implementations, the unlocking script of the second transaction may also include a signature corresponding to a public key associated with the user node. Additionally, the metadata for the second transaction may include an identifier of a specific product or service that is offered by the entity, linking content such as a review submission to the relevant product/service.

To facilitate the process of verifying the validity of content (e.g., reviews) submitted by users and to make tracking of the submitted content tractable, in some implementations, an entity may decide to allow only a limited number of predefined content values (e.g. numeric ratings, descriptive words, etc.) for its products/services. That is, an entity may designate a predetermined set of one or more permitted content values that will be deemed valid. In such cases, a locking script of the first output of the first transaction $T_c$ may include a set of permitted content entries, such as one or more discrete ratings. The first content, in order to be accepted as a valid submission, would then need to correspond to one of the permitted content entries. In some implementations, the set of permitted content entries will include hashes of the one or more permitted content values. In other words, each of the possible content values may be hashed and used in the locking script to lock the first output (incentive tokens). The first output may then be unlocked in multiple ways, by submitting content that corresponds to at least one of the hashed values in the locking script of the first output. Thus, suitable content (such as a suitable review/feedback) may be generated simply by selecting one of the permitted content values (which may be referred to as feedback values or review values) designated by the entity. For example, an indication of the one or more permitted content values may be received at the user node, and content corresponding to one of these acceptable options can be selected and submitted to the blockchain by the user node.

Figure 5:
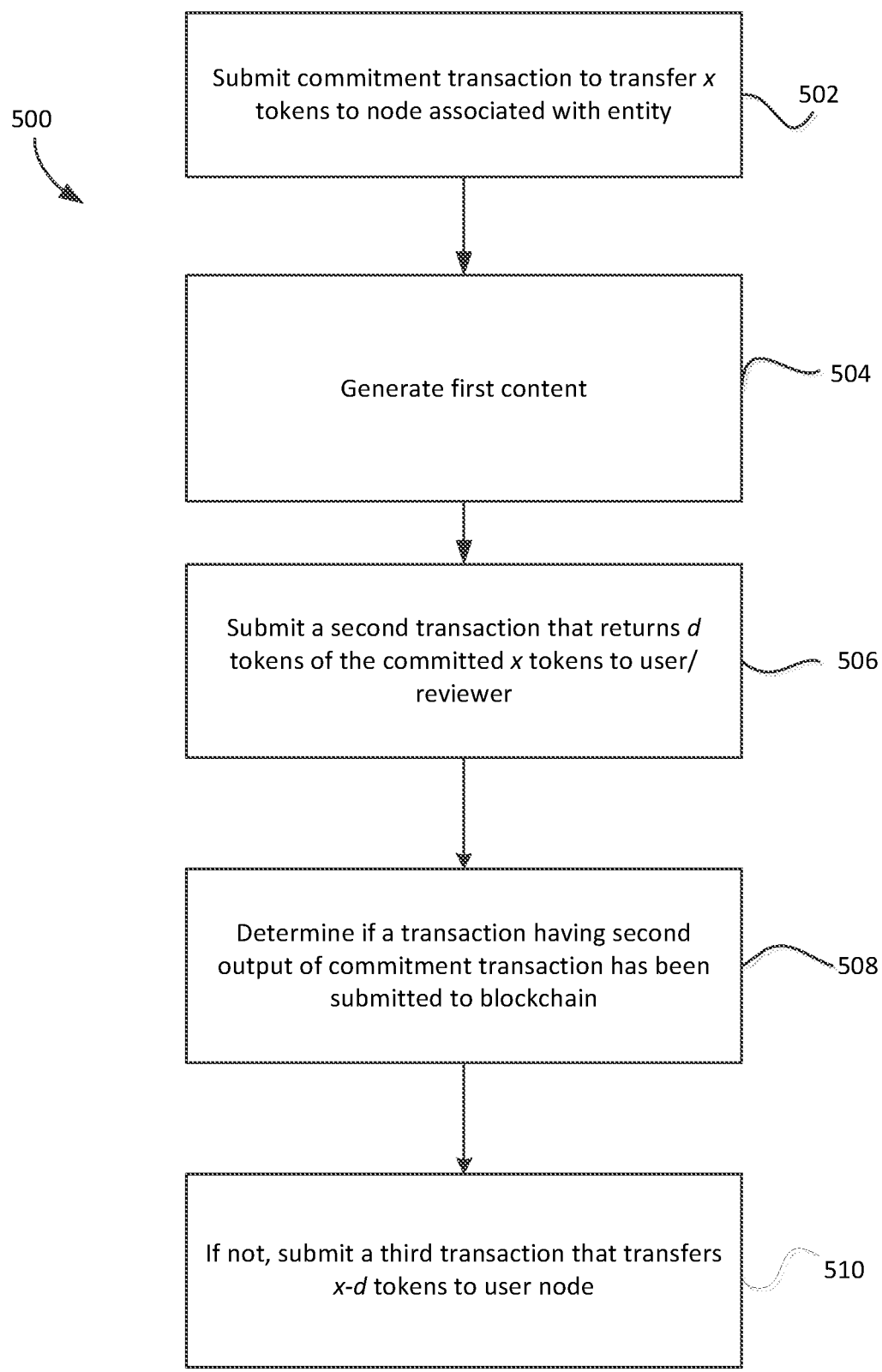
FIG. 5 shows, in flowchart form, another example method for submitting content for an entity to a blockchain, in accordance with an implementation of the present application.

Reference is now made to FIG. 5, which shows, in flowchart form, another example method 500 for submitting content for an entity. The method 500 may be performed by a node in a blockchain network, such as network 100 of FIG. 1. In particular, the node may be associated with a user ("user node") of a product/service who wishes to participate in the CSP. In some implementations, the node is a wallet or other such blockchain entity.

Operations 502, 504 and 506 correspond to, and are similar in scope with, operations 402, 404 and 406 of method 400, respectively. As explained previously, the first transaction $T_c$, which commits an initial quantity x of tokens representing full payment for a product/service for transfer to the entity, has two outputs: a first output representing an "incentive" for content/review submission, and a second output representing the "discounted" payment to the entity. An entity would presumably agree to a lower final received amount (i.e. less than the "sticker" price) for the product or service if, for example, it values the accumulation of reviews for its products/services from actual purchasers and users.

In operation 508, it is determined if a transaction having the second output of the first transaction $T_c$ as an input has been submitted to the blockchain by a first time, nLockTime. In particular, the user node can check whether the entity node (e.g. service provider) has collected the "discounted" payment x−d before a specific point in time. For example, the node can communicate directly with the second node associated with the entity or initiate a search of the blockchain to determine whether a transaction transferring the UTXO of the second output to an address associated with the entity node has been submitted to the blockchain.

If the entity has not claimed its share of the committed quantity x of tokens by a predetermined time, in operation 510, the node submits a third transaction $T_{f_2}$ that transfers the quantity x−d of tokens to an address associated with the user node. Notably, the third transaction $T_{f_2}$ is time-locked, to allow a sufficient amount of time for the entity to be able to claim its "discounted" payment. That is, the third transaction includes a transaction parameter nLockTime which specifies a point in time after which the third transaction becomes eligible for submission to the blockchain. This parameter can be chosen by the user, the entity, or upon agreement by both, to strike a reasonable balance between providing sufficient amount of time for the parties to claim their respective shares of the committed quantity x of tokens and ensuring that reviews or other content are submitted in a timely fashion by user nodes. In some implementations, the transaction parameter nLockTime may specify a point in time that is a fixed length of time (s) after a time (T) at which the first transaction is submitted to the blockchain (i.e. when the initial quantity x is committed). That is, $$\text{nLockTime} = T + s \quad (1)$$

As these parameters are likely agreed upon by an entity and its end users (i.e. customers) prior to their transactions, the third transaction $T_{f_2}$, which directs the unclaimed "discounted" payment to the user node, may be created and signed by the entity prior to submission of the first commitment transaction $T_c$ to the blockchain. That is, the entity node includes a time-lock on the third transaction and makes it accessible to the user node, such that the user node may submit the third transaction and unlock the quantity x−d of tokens using the user's signature.

By way of illustration, an example locking script for the first output of the commitment transaction $T_c$ will be described. For example, the locking script may specify a set of descriptive ratings ("poor-average-good-excellent") as being acceptable content values (i.e. acceptable review or feedback values). A user node can, by submitting content, such as a review that corresponds to one of the acceptable content values, unlock the quantity of tokens (d) associated with the first output. Hence, the locking script will present four options to release the tokens. The script evaluates an unlocking script that includes content which purports to unlock the locking script by checking whether the content submitted by the user node corresponds to one of the four allowed ratings and that a signature provided by the user node corresponds to the user's public key. An extra option, corresponding to the entity refund transaction, may be specified in the unlocking script. In a schematic form, the options of the locking script may read:

Refund: OP_2<pubkey U> <pubkey $S_p$>OP_2 OP_CHECKMULTISIG
Rating 1: OP_HASH160<H(poor)>OP_EQUALVERIFY<pubkey U>OP_CHECKSIG
Rating 2: OP_HASH160<H(average)>OP_EQUALVERIFY<pubkey U>OP_CHECKSIG
Rating 3: OP_HASH160<H(good)>OP_EQUALVERIFY<pubkey U>OP_CHECKSIG
Rating 4: OP_HASH160<H(excellent)>OP_EQUALVERIFY<pubkey U>OP_CHECKSIG Just as a user node can collect the "discount" payment that is unclaimed by an entity node, the entity node may be able to claim the entirety of the initially committed quantity x of tokens if the user node does not submit suitable content, such as a suitable review, before a specific point in time. That is, the entity node can collect the user's share (i.e. the content submission "incentive") if proper content, such as a proper review/feedback for the product or service, is not submitted by the user node within a predefined period of time. In particular, the entity node can submit a refund transaction $T_{f_3}$ that transfers the d tokens that had been allocated as incentive tokens to the entity node. This refund transaction can include a parameter indicating the point in time at which the refund transaction can be submitted to the blockchain. The refund transaction $T_{f_3}$ is created and signed by the user node, before submission of the first (commitment) transaction on the blockchain. In particular, the user node is configured to prepare and sign the refund transaction $T_{f_3}$, including a time-lock which corresponds to the parameter nLockTime and to provide the refund transaction $T_{f_3}$ to the entity node so that the entity node may submit the refund transaction $T_{f_3}$ to the blockchain network after expiration of the time-lock.

The methods 400 and 500 may be implemented as part of a blockchain-based content collection platform such as a blockchain-based reviews and feedback collection platform. In particular, a platform 520 (not shown) for aggregating reviews that are shared by means of blockchain transactions may be provided. The platform 520 may, for example, collect and organize the submitted content/feedback/reviews for a specific entity or a plurality of different reviewed entities. The platform 520 may be implemented as a web portal, computer software, and/or a mobile software module. The platform 520 may provide various different functionalities, such as sorting, organizing, and searching blockchain transactions that contain reviews of entities and their products/services. For example, searches of the blockchain may be performed using information, such as transaction script metadata, input and output addresses, etc. to locate those transactions that contain embedded reviews and feedback. The search results (i.e. blockchain transactions) may be sorted by, for example, reviewed entity, product/service type, product/service ID, technique of review submission, highest-to-lowest (or lowest-to-highest) numeric rating, etc.

Additionally, in some implementations, the platform 520 may allow for filtering of content, such as reviews, to identify reviews or other content that are potentially invalid or fake. For example, in the proposed techniques of method 400 and 500, a node submits content, such as a review, by including it in the transaction script for a transaction that returns a certain quantity of "incentive" tokens to the node. If an unauthorized user gains access to information regarding a commitment transaction that transfers payment for a product/service to an entity, it may be possible for the user to submit a transaction that satisfies the conditions of the locking script for the commitment transaction and, as a result, also submit an invalid review of the entity and/or its products/services. The platform 520 can be used to filter out such unauthorized reviews based on criteria that is communicated to the platform 520 by entities that are reviewed. For example, the platform 520 may be configured to detect those reviewers who have not purchased a product/service from an entity and discard reviews submitted by nodes associated with those unauthorized reviewers.

Figure 6:
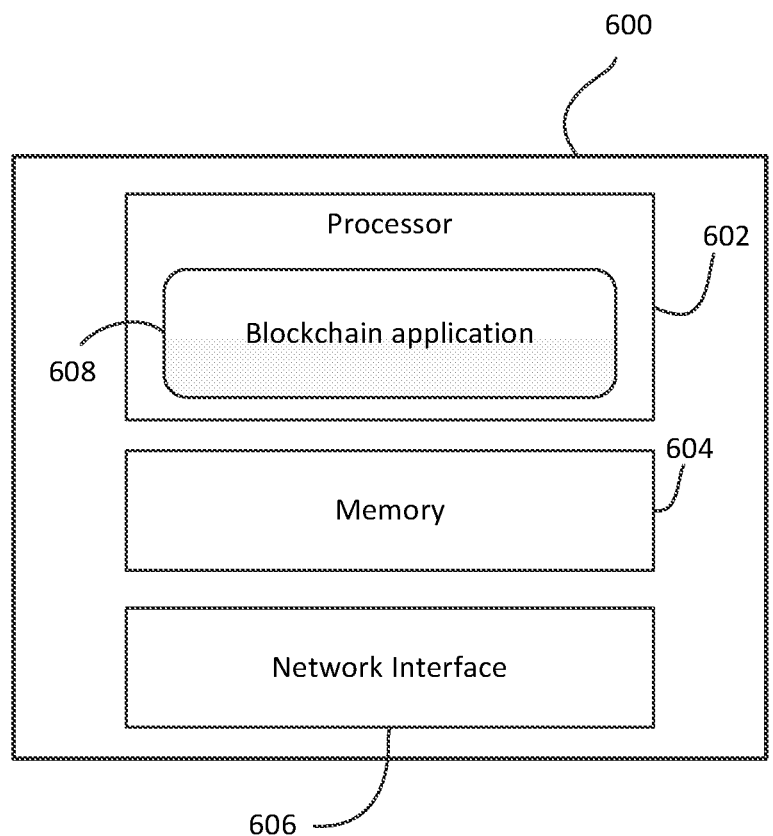
FIG. 6 shows, in block diagram form, an example blockchain node.

Reference will now be made to FIG. 6, which shows, in block diagram form, a simplified example of a node 600, which may, in the context of the present disclosure, be a participating node and/or an entity node. The node 600 includes a processor 602, which may include one or more microprocessors, application specific integrated chips (ASICs), microcontrollers, or similar computer processing devices. The node 600 further includes memory 604, which may include persistent and non-persistent memory, to store values, variables, and in some instances processor-executable program instructions, and a network interface 606 to provide network connectivity over wired or wireless networks.

The node 600 includes a processor-executable blockchain application 608 containing processor-executable instructions that, when executed, cause the processor 602 to carry out one or more of the functions or operations described herein.

It will be understood that the devices and processes described herein and any module, routine, process, thread, application, or other software component implementing the described method/process for configuring the blockchain node may be realized using standard computer programming techniques and languages. The present application is not limited to particular processors, computer languages, computer programming conventions, data structures, or other such implementation details.

It should be noted that the above-mentioned implementations illustrate rather than limit the invention, and that those skilled in the art will be capable of designing many alternative implementations without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such element and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method for transmitting data to a blockchain, the method comprising:
   transmitting, to the blockchain, a first transaction for committing a first quantity of tokens to transfer to a second node associated with an entity, the first transaction having a first output and a second output different from the first output
   generating first content for transmission to the blockchain;
   transmitting, to the blockchain, a second transaction that returns a second quantity of the committed first quantity of tokens to an address associated with a first node, the second transaction having the first output of the first transaction as an input, wherein the first content is used to unlock the first output of the first transaction;
   determining that a transaction having the second output of the first transaction as an input has been transmitted to the blockchain by a first time; and
   in response to the determination, transmitting, to the blockchain, a third transaction that transfers a third quantity of the committed first quantity of tokens to an address associated with the first node.

2. The method of claim 1, wherein the third transaction includes a transaction parameter specifying a point in time after which the third transaction becomes eligible for transmission to the blockchain.

3. The method of claim 2, wherein the transaction parameter specifies a point in time that is a fixed length of time after a time at which the first transaction is transmitted to the blockchain.

4. The method of claim 1, wherein the third transaction is created and signed by the entity prior to transmission of the first transaction to the blockchain.

5. The method of claim 1, wherein the third quantity is equal to the difference between the first quantity and the second quantity.

6. A computing device to participate in a process for transmitting content for an entity to a blockchain, the computing device configured to carry out the method claimed in claim 1.

7. A non-transitory processor-readable medium storing processor-executable instructions to participate in a process for transmitting content to a blockchain, wherein the processor-executable instructions, when executed by a processor, cause the processor to carry out the method claimed in claim 1.

* * * * *